UNITED STATES PATENT OFFICE.

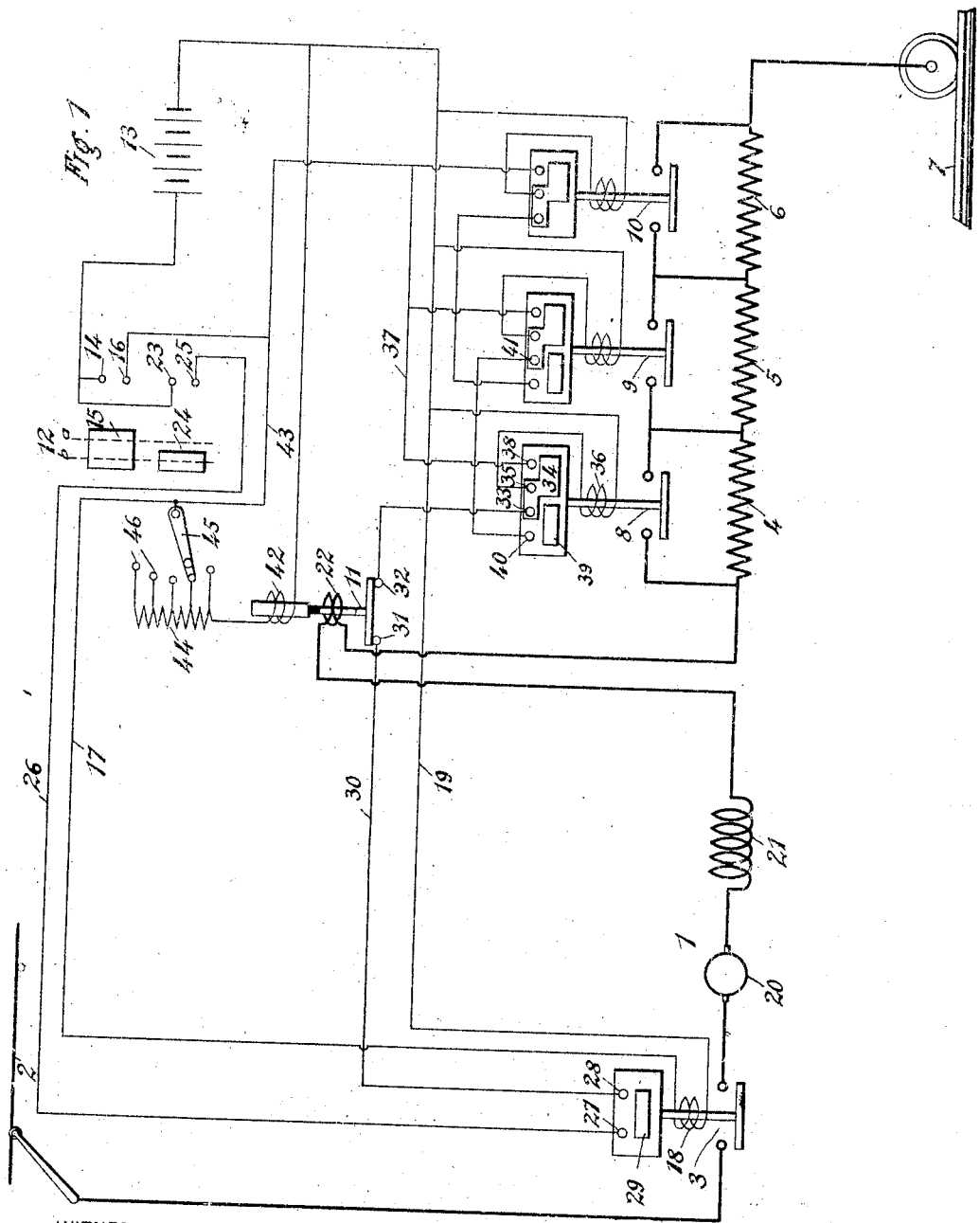

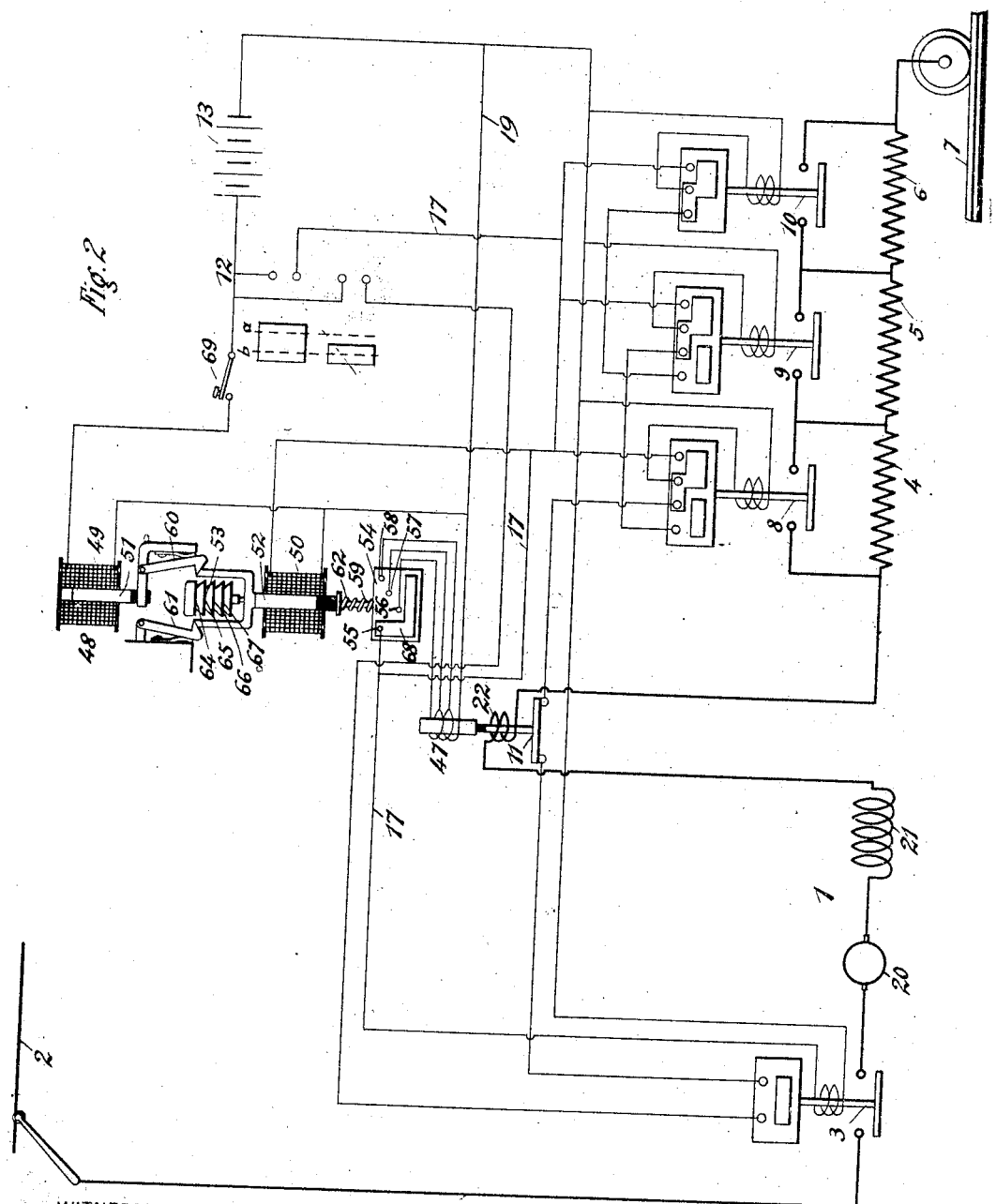

LOUIS M. ASPINWALL, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM FOR ELECTRIC MOTORS.

No. 870,284.　　　Specification of Letters Patent.　　　Patented Dec. 10, 1907.

Application filed April 4, 1906. Serial No. 309,897.

*To all whom it may concern:*

Be it known that I, LOUIS M. ASPINWALL, a citizen of the United States, and a resident of Wilkinsburg, in the county of Allegheny and State of Pennsylvania, have invented a new and useful Improvement in Control Systems for Electric Motors, of which the following is a specification.

My invention relates to control systems for electric motors and has special reference to such systems as embody means for effecting an automatic acceleration of the motors.

The object of my invention is to provide, in a system of the class above indicated, means dependent upon a predetermined value of electric current flowing in the motor circuit for retarding the accelerating action, that shall comprise a single limit switch and may be adjusted at the will of the attendant.

In the operation of variable-speed motors, such as are employed for electric railway vehicle service, it has been found desirable and economical to employ a system of automatic acceleration which has usually comprised a plurality of switches so interlocked as to confine their operation to a predetermined sequence. With such an arrangement, it is advisable to use a device for preventing the closure of each accelerating switch until the current flowing in the motor circuit falls below a predetermined value, in order that the motors may not be injured by increasing the applied voltage too rapidly. A common form of such a device comprises a magnet coil which is connected in series with the motor circuit and a switch to be actuated thereby and adapted to interrupt the circuit which supplies energy for operating the accelerating switches. Devices of this character have proved satisfactory when the load on the motor equipment at starting has been approximately constant, as in a single motor vehicle or in a train of vehicles each of which is supplied with an adequate motor equipment, but in control systems for electric locomotives which may be called upon to haul variable loads that are dependent upon the length and character of the train, it is desirable to provide means for adjusting the predetermined current value at which the limiting device will operate in order that the time consumed in accelerating may be kept substantially constant for all loads. This result may be accomplished by providing means for varying the number of turns included in series with the motor circuit at any one time but, since relatively large currents flow through the motor circuit, I have provided means for adequately controlling the action of the limiting device from the auxiliary circuits which are traversed by relatively small currents.

My invention is illustrated in the accompanying drawings in which

Figure 1 is a diagrammatic view, of a system of electric motor control embodying my invention, the limiting device shown therein comprising a single limit switch, and an auxiliary magnet winding which is opposed to the main circuit winding and which is supplied with energy through a variable resistance. Fig. 2 is a view, similar to Fig. 1 in which the auxiliary magnet winding for the limit switch is provided with a plurality of intermediate taps, means being provided for supplying energy to the whole or a part of the winding at the will of the attendant.

Referring to Fig. 1, energy is supplied to an electric motor 1, from a supply line conductor 2, through a switch 3 and resistance sections 4, 5 and 6 to an opposite line conductor 7. The amount of resistance included in circuit at any one time is determined by accelerating switches 8, 9 and 10 which are adapted to close automatically in a predetermined sequence and are governed by a limit switch 11 and a master controller 12. When the master controller 12 is moved from its "off" position to the position a, energy is supplied from a battery 13 through contact terminal 14, contact member 15, contact terminal 16 and conductor 17 to an actuating magnet winding 18 of the switch 3, circuit being completed from this point through a conductor 19 to the negative terminal of the battery. When the switch 3 is closed, a circuit is completed from the line conductor 2 through switch 3, armature 20 and field magnet winding 21 of the motor 1, magnet winding 22 of the limit switch 11, and resistance sections 4, 5 and 6 to the opposite line conductor 7. If it is now desirable to accelerate the motor, master switch 12 may be moved to position b to complete the battery circuit from contact terminal 14 through contact terminal 23, to which it is connected, contact member 24, contact terminal 25, conductor 26, contact terminals 27 and 28, which are connected by bridging contact member 29 when the switch 3 is closed, conductor 30, contact terminals 31 and 32, which are connected when the limit switch 11 is closed, contact terminal 33, contact member 34, and contact terminal 35, to the actuating magnet winding 36 of the switch 8, from which point circuit is completed to the negative conductor 19. As soon as the switch 8 is closed, resistance section 4 is short-circuited, and energy is supplied to the magnet winding 36 from conductor 37, which is connected to contact terminal 16, through contact terminal 38 which has now come into engagement with contact member 34. In this way, the initial operation of the switch 8 is dependent upon the closing of the limit switch 11 but, when once closed, it is held in such position irrespective of the position occupied by the limit switch, since energy is applied directly to its magnet winding from the battery 13, through the master controller 12.

Since the magnet winding 22 of the limit switch 11 is connected in series circuit with the motor 1, the switch 8 may not be closed until the current flowing through the motor circuit has decreased sufficiently to permit the closing of the limit switch. When the switch 8 again occupies its closed position, energy is supplied, as before, through limit switch 11 to contact terminal 33, which now engages a contact member 39, from which point the circuit is continued through a contact terminal 40 to a contact terminal 41 of the switch 9, which corresponds to the contact terminal 33 of the switch 8, consequently the switch 9 may not be closed until the switch 8 has been closed and it is also similarly dependent upon the closing of the limit switch 11. When the switch 9 is closed, resistance section 5 is short-circuited and energy may be supplied through the limit switch to an actuating magnet of the switch 10 which, when closed, short-circuits the resistance section 6.

When the load on the motor 1 is such that it is desirable to accelerate the motor more rapidly than the coil 22 of the limit switch will permit, the pull exerted by the said coil may be opposed to the desired degree. As illustrated in Fig. 1 of the drawings, the desired regulation is effected by means of an auxiliary magnet winding 42 which exerts a force in opposition to the force exerted by the coil 22 and is supplied with energy from contact terminal 16 of the master switch 12, through a conductor 43, a movable contact arm 45 and a portion or all of a variable resistance 44. When all the resistance 44 is included in the auxiliary winding circuit, a minimum force opposes the pull exerted by the winding 22.

The energy supplied to the winding 42 may be increased, and the opposing force proportionately strengthened, by decreasing the active length of the resistance 44 through the coöperation of the contact arm 45 and a series of contact terminals 46, which are connected to the end and intermediate points of the resistance.

Since the action of the limit switch depends upon both the winding 22 and the winding 42, its operation may be varied by varying the ampere turns of the magnet winding 42 in any practicable manner.

Referring to Fig. 2, which illustrates a similar system to that of Fig. 1, the limiting switch 11 is provided with an auxiliary magnet winding 47 which corresponds to the winding 42 of Fig. 1, the ampere turns of the winding being varied in this case by adjusting the number of convolutions included in the circuit at any time, which adjustment is effected by a device 48. The device 48 comprises electro-magnets 49 and 50 having movable core members 51 and 52, a ratchet member 53, a movable contact-bearing member 54 and engaging fingers 55, 56, 57 and 58. The ratchet member 53 and the contact member 54 are attached to opposite extremities of a connecting rod 59 which extends through a hole in the movable core member 52 of the electro-magnet 50 in which it is free to operate. The ratchet member may be engaged by a pawl 60 which is pivotally connected to the movable core member 51 of the electro-magnet 49 and by a stationary pawl 61. When the electro-magnet 49 is deënergized the core member 51 occupies its lowest position and a spring 62 is interposed between the contact bearing member 54 and the movable core member 52 of the electro-magnet 50 in order to force the rod and the core member in opposite directions and normally hold the latter at the upper extremity of its path of movement. The upper end of the movable core member 52 is beveled and when the electro-magnet 50 is deënergized, the beveled edge moves the pawls 60 and 61 out of engagement with the ratchet member 53. The ratchet member is provided with notches 64, 65, 66 and 67 and the arrangement of the parts is such that when current is supplied to electro-magnet 50 and electro-magnet 49 is deënergized, both pawls engage the notch 64 and the contact finger 55 engages a contact member 68. If the electro-magnet 49 is then energized, the core member 51 is moved to its uppermost position, against the force of gravity, and the ratchet member 53, the connecting rod 59 and the movable contact member 54 are moved by the pawl 60 until the stationary pawl 61 engages the notch 65. In a similar manner, by continuing to intermittently energize the electro-magnet 49, the stationary pawl 61 successively engages the notches 66 and 67 and the movable contact member 54 is moved successively into engagement with contact fingers 57 and 58.

If the electro-magnet 50 is deënergized at any stage of the operation, the ratchet member 53 is immediately released from the pawls 60 and 61 by the movable core member 52, and the contact member 54 is returned to its initial position by the action of the spring 59.

The intermittent energizing of the electro-magnet 49 may be effected by the operation of a simple make and break switch 69 and the energizing of the electro-magnet 50 is dependent upon the master switch 12 so that the movable member 54 is returned to its initial position when the master switch is moved to its "off" position. The contact fingers 55, 56, 57 and 58 are connected to one extremity and to intermediate points of the winding 47 and the opposite extremity of this winding is connected to the negative battery terminal through conductor 19. The contact finger 55 is connected to the supply conductor 17 and is adapted to continuously engage the contact member 68 as the latter moves into engagement with fingers 56, 57 and 58 successively through the action of the pawls 60 and 61 upon the notches 64, 65, 66 and 67 of the ratchet member 53.

It will be observed that when the movable contact member 54 occupies its initial position no energy is supplied to the winding 47 and that as it is moved through its other succeeding positions, energy may be supplied to a part or the whole of the winding 47. In this way, the opposing force exerted by the winding 47 may be varied at the will of the attendant by intermittently closing the switch 69.

It will be noted that adjustment of the magnetic force exerted by the winding 47 is effected by varying the number of convolutions included in the circuit whereas adjustment of the magnetic force exerted by the winding 42 of Fig. 1 is effected by varying the amount of current flowing through the coil by means of a resistance in series therewith. The latter method is advantageous for the reason that a single supply conductor is necessary for the auxiliary winding while the former method is advantageous for the reason that no current is supplied to the auxiliary winding under normal operating conditions and for the further reason that the device is automatically returned to its initial position when the master switch is returned to its "off" position.

Although the systems illustrated comprise single motors and control systems therefor, my invention is not restricted to such arrangements but may and probably will be applied to railway vehicle equipments in which several motors are employed.

I claim as my invention:

1. The combination with a plurality of motor-controlling switches that are adapted to close in a predetermined sequence, a master controller and a limit switch for retarding the operation of said motor-controlling switches, of an independently controlled means for regulating the action of said limit switch.

2. The combination with a plurality of motor-controlling switches that are adapted to close in a predetermined sequence, a master controller and a limit switch for retarding the operation of said motor-controlling switches, an opposing magnet coil for said limit switch, and means independent of the master controller for varying the ampere turns in said coil.

3. The combination with a plurality of motor-controlling switches that are adapted to close in a predetermined sequence, a master controller and a limit switch for retarding the operation of said motor-controlling switches, an opposing magnet coil for said limit switch, a resistance in series circuit therewith, and an independently operated switch for varying the said resistance.

4. The combination with an electric motor, resistance sections in series therewith, short-circuiting switches for said resistance sections that are adapted to close in a predetermined sequence, a master controller and a single limit switch, of means for adjusting the operation of the limit switch, said means comprising a switch the operation of which is independent of the master controller.

5. The combination with an electric motor, resistance sections in series circuit therewith, switches that are adapted to short-circuit the resistance sections, a limiting switch which is dependent for its action upon the current flowing in the motor circuit, and a master controller, of an auxiliary magnet coil and means for varying the ampere turns of said coil, said means comprising an independently operated switch.

6. The combination with an electric motor, resistance sections in circuit therewith, short-circuiting switches therefor which are adapted to close in a predetermined sequence, a master controller, and a limit switch having an operating coil connected in series with the motor circuit, of an auxiliary magnet coil which is opposed to the main circuit coil, and means for varying the ampere turns in the auxiliary coil, said means comprising an independently operated switch.

In testimony whereof, I have hereunto subscribed my name this 30th day of March, 1906.

LOUIS M. ASPINWALL.

Witnesses:
 H. A. MULLETT,
 BIRNEY HINES.